United States Patent [19]

Borbely

[11] 4,126,584

[45] Nov. 21, 1978

[54] PROCESS FOR TREATING SILVER OXIDE

[75] Inventor: Alexander S. Borbely, Peabody, Mass.

[73] Assignee: P. R. Mallory & Co. Inc., Indianapolis, Ind.

[21] Appl. No.: 783,584

[22] Filed: Apr. 1, 1977

[51] Int. Cl.$^2$ .......................... C01G 5/00; H01M 4/54
[52] U.S. Cl. ..................................... 252/518; 429/219; 423/604; 264/104
[58] Field of Search ........................ 423/604; 429/219; 252/518, 514, 182.1; 264/61, 65 BH, 104, 105, DIG. 25

[56] References Cited

U.S. PATENT DOCUMENTS

| | | | |
|---|---|---|---|
| 3,055,964 | 9/1962 | Solomon et al. | 429/219 |
| 3,276,975 | 10/1966 | Holechek | 429/219 |
| 3,476,601 | 11/1969 | Berger et al. | 429/219 |
| 3,503,810 | 3/1970 | Groce | 264/105 |
| 3,926,678 | 12/1975 | Tsuchida et al. | 429/219 |

FOREIGN PATENT DOCUMENTS

| | | | |
|---|---|---|---|
| 550,471 | 12/1957 | Canada | 429/219 |
| 12,433 | 1/1977 | Japan | 423/604 |

OTHER PUBLICATIONS

Allen, J., "The Thermal Decomposition of Silver (I) Oxide," Australian J. Chem., vol. 13, 1960, pp. 431–442.
Kato et al., "Effects of Annealing on the Thermal Decomposition of Silver (I) Oxide," as abstracted in Chem. Abstracts, #942116, vol. 73, 1970.

Primary Examiner—Brian Hearn
Attorney, Agent, or Firm—Ronald S. Cornell; Martin M. Glazer; Charles W. Hoffmann

[57] ABSTRACT

A process for treating monovalent silver oxide ($Ag_2O$) alone or in combination with other materials to increase its compressibility, increase its ability to absorb electrolyte, and decrease its carbon dioxide absorption rate by the step of heating the silver oxide or silver oxide mixture to temperatures of from about 150° C to about 300° C for a period of time from about 1 hour to about 5 hours.

8 Claims, No Drawings

PROCESS FOR TREATING SILVER OXIDE

This invention relates to a process for treating monovalent silver oxide ($Ag_2O$) or a monovalent silver oxide mixture to increase its compressibility while decreasing its ability to absorb carbon dioxide and to increase the ability of the compressed tablet thereof to absorb electrolyte.

Silver oxide is often used as an electrode in electrochemical cells. Typical cells of this type contain a cathode made from a mixture of powdered monovalent silver oxide and 3 percent to 15 percent by weight of manganese dioxide. The mixture is compressed into a solid slug and placed in a cell can where it is separated by an absorbent layer of cellulosic material from an anode which may be amalgamated zinc powder. An electrolyte such as aqueous potassium hydroxide is added before the cell is sealed, and the electrolyte is usually absorbed into the cathode. Typically, the monovalent silver oxide used in the cathode is manufactured from silver and nitric acid, with the silver oxide being precipitated out of solution by the use of sodium hydroxide.

Cathodes of this type are generally manufactured by mixing the monovalent silver oxide powder with about 3 percent to 15 percent manganese dioxide. A lubricant, such as polytetrafluoroethylene is also used in many cases. The amount of lubricant added is usually less than about 1% by weight. This mixture is pressed into a slug or sheet which is then granulated, for example by pressing it through a U.S. number 18 sieve. These granules are then pressed to about 66 to 86%, preferably about 72 to 82% of the theoretical density of the mixture. The resulting pellets are heated to 460° C. for several seconds to drive off carbonate present in the pellet and then heat treated by a gas flame to produce a conductive silvery surface. The cathode is then incorporated into the can and thereafter the electrolyte, which may be a potassium hydroxide solution, is placed on the top of the pellet and allowed to be absorbed.

It has been discovered that the process described above for making monovalent silver oxide does not consistently provide a product having uniform physical and chemical properties. Apparently, these physical and chemical properties are affected by minor variations in such variables as the concentration of the silver nitrate solution used, the reaction temperature and time, drying atmosphere, whether air or vacuum, and subsequent treatments of the powder, as pulverization and screening. Thus the monovalent silver oxide from various manufacturers, and sometimes from one batch to another from the same manufacturer, varies in its physical and chemical properties.

One of the important physical properties is compressibility. Compressibility is the relative amount of pressing pressure needed to compress a specific amount of monovalent silver oxide to a desired density. Thus, low compressibility means that more pressure must be applied to achieve a certain density than would be needed if the monovalent silver oxide had a high compressibility.

Because of the variations in compressibility and other physical and chemical properties of the monovalent silver oxide being produced a severe problem has appeared in some pressed pellets. This problem is the formation of laminations or planar cracks within the pressed pellets. These defects are formed perpendicular to the pressing direction, and vary from large ones which are visible to the naked eye to very fine ones.

It is believed that the major reasons for the formation of these laminations are the elastic recovery stresses which tend to pull interfaces apart, stresses parallel to the compaction direction act on flattened porosity and tend to extend pores and because of the low compressibility of silver oxide high compaction pressures are required that may lead to increased flattened type of porosity and possibly induce fractures of particles themselves that lead to crack-pore combinations on a large scale which are very susceptible to stresses induced by ejection or elastic recovery.

It has now been discovered that highly acceptable monovalent silver oxide can consistently be obtained if it is treated at a temperature between about 150° C. and about 300° C. for about 1 to 5 hours. This treatment increases the compressibility of the monovalent silver oxide, and produces a final pellet for use as a cathode without the laminations found in corresponding untreated pellets. Monovalent silver oxide made by various manufacturers has been treated, and all of the resulting pellets have been found to be acceptable.

It has also been found that the monovalent silver oxide can be treated even after it has been mixed with manganese dioxide and a lubricant, pressed and granulated. Thus, the silver oxide can be treated at any time in the processing of the cathode; from the time it is made until the mixture is ready to be pressed into a finished pellet.

The present invention contemplates the step of pressing the treated silver oxide in admixture with manganese dioxide and a lubricant into pellet form. Generally, this is accomplished using a pressure that may vary between about 5 and 40 tons per square inch (Tsi).

Treatment of the monovalent silver oxide in the manner described herein has also been found to alleviate two other problems associated with $Ag_2O$ cathode manufacturing processes. Dry monovalent silver oxide is very reactive and rapidly absorbs carbon dioxide from the atmosphere. The carbon dioxide reacts with cathode materials to form carbonates. Since excessive carbonates in the cathode can be detrimental to the cell's performance, the cathode has in the past been treated at 460° C. to remove excess carbonates already present. Thus, the heat treatment can be eliminated with a resulting decrease in the cost of producing a cathode.

During manufacture of electrochemical cells, potassium hydroxide electrolyte is dispensed onto the surface of the monovalent silver oxide pellet. The surface of the pellet has previously often had a layer of silver thereon to improve conductivity. Many times, because of slow absorption of electrolyte, the silvery surface of the pellet is oxidized by the potassium hydroxide electrolyte. This becomes apparent when the surface of the pellet changes color to blue or black. This in turn decreases the conductivity of the surface. It has been found that the use of pretreated monovalent silver oxide decreases substantially the extent of oxidation of the silvery surface. Sometimes oxidation does not occur at all.

The heat treatment of the present invention employs a range of temperatures that can vary from about 150° C. to about 300° C. A temperature of about 150° C. is the minimum temperature that will give the desired results. Lower temperatures of about 90° C. to 120° C., were tested and found to be insufficient to bring about the desired results. The higher end of the temperature range is limited by the tendency of monovalent silver oxide to decompose at about 300° C. This temperature appears to be the practical upper limit of the temperature range. In a preferred embodiment of this invention a temperature range of between about 150° C. and 250° C. is used. Most preferably, the temperature will be between about 175° C. and 225° C.

For the heat treatment of monovalent silver oxide the use of an air atmosphere is desirable, although neutral atmosphere (i.e. nitrogen, argon, helium or a vacuum) also can be applied.

The duration of time during which the heat treatment is carried out will vary depending upon the treatment time. Generally, the time will be between about one and five hours, preferably, between about 1 to 3 hours, and most preferably between about 2 to 2.5 hours.

Following the heat treatment of this invention the treated monovalent silver oxide may be positively cooled to room temperature, but often it is desirable to permit the material to cool without any positive cooling step. It is desirable, from a fuel conservation standpoint, to use the treated material to indirectly heat the incoming feed material.

The following examples are given to illustrate the efficacy of the present invention. In the examples, as well as throughout the specification and claims, all parts and percentages are by weight unless otherwise indicated.

EXAMPLE I

Monovalent silver oxide as obtained from the manufacturer was found to be unacceptable. Accordingly, it was treated at various temperatures for varying periods of time as shown in Table I. In each instance for these tests the process was carried out in an air atmosphere. As can be seen from Table I there was always a significant increase in the pressed density of the cathodes made from the treated monovalent silver oxide as compared to those cathodes made from untreated monovalent silver oxide. This shows that an increase in the compressibility of the treated monovalent oxide can be obtained, since a higher density for a given pressing pressure is indicative of a higher compressibility and a more acceptable product.

TABLE I $Ag_2O$ POWDER-Pressed Densities (GRAM/CC) at Various Pressing Pressures

| Pressing Pressures (TSi)* Type Of Treatment | 2.5 | 5.0 | 7.5 | 12.6 | 17.7 | 22.7 | 30.3 | 40.4 |
|---|---|---|---|---|---|---|---|---|
| Not Treated | 5.00 | 5.29 | 5.41 | 5.69 | 5.97 | 6.11 | 6.24 | 6.37 |
| 150° C 1Hr | 5.15 | 5.40 | 5.53 | 5.89 | 6.15 | 6.28 | 6.41 | 6.49 |
| 150° C 2.5Hrs | 5.14 | 5.50 | 5.66 | 5.93 | 6.21 | 6.31 | 6.43 | 6.55 |
| 150° C 5Hrs | 5.30 | 5.51 | 5.72 | 5.90 | 6.18 | 6.33 | 6.40 | 6.58 |
| 180° C 1Hr | 5.11 | 5.41 | 5.55 | 5.85 | 6.12 | 6.27 | 6.39 | 6.43 |
| 180° C 2.5Hrs | 5.17 | 5.48 | 5.67 | 6.19) | 6.19 | 6.31 | 6.41 | 6.59 |
| 180° C 5Hrs | 5.23 | 5.56 | 5.68 | 5.89 | 6.16 | 6.34 | 6.42 | 6.56 |

*By "Tsi" is meant tons per square inch.

EXAMPLE II

Table II compares the pressed densities of an untreated mixture of 95% monovalent silver oxide, 4.7% manganese dioxide and 0.3% of polytetrafluoroethylene powder lubricant with that of a similar mixture that has been treated at 150° C. for 2.5 hours. It can be seen from Table II that in every case the treated mixture had a higher pressed density at a given pressing pressure that the untreated mixture. Table II shows that the compressibility of the monovalent silver oxide can be increased by treatment even after it has been mixed with manganese dioxide and a suitable lubricant.

TABLE II

PRESSED DENSITIES (gram/cc) OF TREATED AND UNTREATED MIXTURES AT VARIOUS PRESSING PRESSURES

| | Pressing Pressures (Tsi) | | | |
|---|---|---|---|---|
| | 2.5 | 5 | 10 | 20 |
| $Ag_2O$ + $MnO_2$ + lubricant Not Treated | 4.85 | 4.99 | 5.33 | 5.83 |
| $Ag_2O$ + $MnO_2$ + lubricant Treated at 150° C for 2.5 Hrs | 5.10 | 5.40 | 5.65 | 6.10 |

| | 30 | 40 | 50 | 60 | 70 |
|---|---|---|---|---|---|
| $Ag_2O$ + $MnO_2$ + lubricant Not Treated | 5.99 | 6.10 | 6.29 | 6.26 | 6.25 |
| $Ag_2O$ + $MnO_2$ + lubricant Treated at 150° C for 2.5 Hrs | 6.25 | 6.40 | 6.45 | 6.50 | 6.51 |

EXAMPLE III

The carbonate content of untreated monovalent silver oxide was determined. The carbonate content of the monovalent silver oxide was again determined after it was treated at various temperatures. The results, as shown in Table III, indicate a significant drop in carbonate content on treatment at 150° C. and an even larger drop in carbonate content after treatments at higher temperatures. The treatments set forth in Table III were each carried out for 2 hours.

TABLE III

EFFECT OF TREATMENT ON THE CARBONATE CONTENT OF MONOVALENT SILVER OXIDE POWDERS

| Treatment Temperature | % $CO_3$ |
|---|---|
| Not Treated | 0.186 |
| 150° C | 0.0795 |
| 175° C | 0.059 |
| 200° C | 0.0575 |
| 225° C | 0.0370 |
| 250° C | 0.0495 |
| 275° C | 0.064 |
| 300° C | 0.0585 |
| 325° C | 0.062 |
| 350° C | 0.060 |
| 375° C | 0.0115 |

EXAMPLE IV

Monovalent silver oxide that had previously not been satisfactory for use in cathodes was treated at 150° C. for 2.5 hours then mixed with 4.7% manganese dioxide and 0.3% of polytetrafluoroethylene powder. This mixture was then pressed into pellets for cathodes. Some were thereafter heat treated at 460° C. for 22 seconds to remove any carbonate present. The surfaces of all were converted or silvered by an acetylene torch. Then the pellets were consolidated into a can, and 8–10 mg of electrolyte was placed on the surface of each pellet. The time it took for the electrolyte to be adsorbed and the amount of electrolyte adsorbed were measured. These results were compared to the adsorption time and amounts adsorbed for pellets made from a monovalent silver oxide that had been satisfactorily used before, and to a monovalent silver oxide that had been used in regular production of cathodes. The results show that the treated monovalent silver oxide now made pellets that would adsorb the electrolyte properly, and in a similar time span as that of the previously satisfactory monovalent silver oxide that had properly adsorbed the electrolyte without treatment. The results in Table IV also show the poor results obtained with the pellets made from untreated monovalent silver oxide previously used in the production of pellets for cathodes.

TABLE IV

DENSITIES OF PRESSED TREATED, "SILVERED" PELLETS AND ADSORPTION TIMES

|  |  | Previously Unsatisfactory $Ag_2O$ treated at 150° C for 2.5 Hrs. then mixed with 4.7% $MnO_2$ + 0.3% lubricant | | Previously Satisfactory $Ag_2O$ + 4.7% $MnO_2$ + 0.3% lubricant | | Production Batch ($Ag_2O$ + 4.7% $MnO_2$ + 0.3% lubricant) | |
|---|---|---|---|---|---|---|---|
|  |  | Treated 460° C for 22 seconds | Not Treated at 460° C | Not Heat Treated at 460° C | | Heat Treated at 460° C for 22 seconds | Not Treated at 460° C |
| Pressed Density | g/c | 5.51 | 5.51 | 5.58 | | 5.50 | 5.50 |
|  | percent of theoretical density (6.9598) | 79.16 | 79.16 | 80.17 | | 79.02 | 79.02 |
| Adsorption Of Electrolyte | Time in minutes | 3–5 | 5–6 | 4–7 | | 6–10 | 5–12 |
|  | Percentage of full Adsorption | 100 | 100 | 100 | | 82 | 66 |

What is claimed is:

1. A process for treating monovalent silver oxide which comprises the step of heating the monovalent silver oxide to a temperature in the range of about 150° C. to about 300° C. for a period of time from about 1 hour in an air atmosphere to about 5 hours.

2. The process of claim 1, wherein said temperature is about 175° C. to about 225° C. and said time is from about 1 hour to about 3 hours.

3. The process of claim 1, wherein the treated monovalent silver oxide is permitted to cool to room temperature.

4. A process for compressing monovalent silver oxide into pellets which comprise the steps of heating the monovalent silver oxide to a temperature in the range of about 150° C. to about 300° C. for a period of time from about 1 hour to about 5 hours in an air atmosphere, and thereafter pressing the resulting silver oxide into pellets with a compressive force of between about 5 and 40 tons per square inch.

5. The process of claim 4, wherein said temperature is in the range of about 150° C. to about 250° C. and said time is from about 1 hour to about 3 hours.

6. The process of claim 4, wherein said monovalent silver oxide when treated is in admixture with about 3% to 15% manganese dioxide and up to about 1% of a lubricant.

7. The process of claim 6 wherein said mixture has been pressed and granulated prior to said treatment.

8. The process of claim 7, wherein said temperature is about 200° C and said period of heating is about 2 hours.

* * * * *